June 10, 1930. C. F. ROBERTS 1,762,562
THREAD SWELLING MACHINE
Filed Aug. 30, 1928
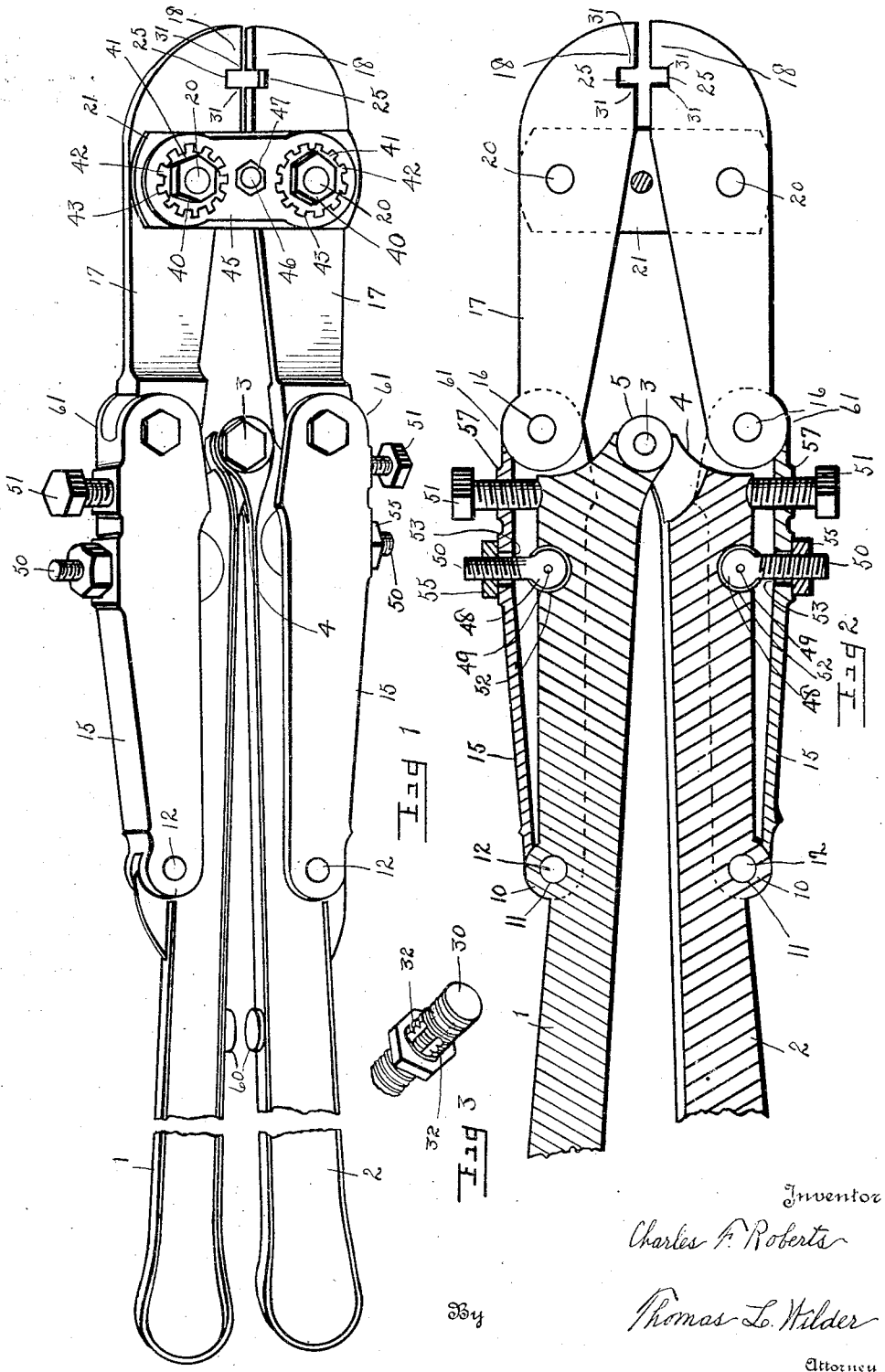
Inventor
Charles F. Roberts
By Thomas L. Wilder
Attorney Patented June 10, 1930

1,762,562

UNITED STATES PATENT OFFICE

CHARLES F. ROBERTS, OF UTICA, NEW YORK, ASSIGNOR TO HERBERT S. POWELL, OF UTICA, NEW YORK

REISSUED

THREAD-SWELLING MACHINE

Application filed August 30, 1928. Serial No. 303,089.

My invention relates to a thread swelling machine, and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a device for bulging or swelling the threads of a bolt in such manner as to raise or elevate the portions of the thread in diametrically opposite portions to prevent the nut mounted on said bolt from turning thereoff. In practice the nut will be screw mounted on the bolt to a tight fitting position adjacent the object held in place. The device will then be used to swell the threads of the bolt just back of the nut to raise or form an elevation of the adjacent threads, whereby to lock the nut in given position on the bolt. The object will be understood by referring to the drawings in which:

Fig. 1 is a perspective view of the device showing parts broken away.

Fig. 2 is a central, vertical section showing parts broken away.

Fig. 3 is a perspective view, showing parts broken away, of a bolt illustrating the same after the nubs have been made therein by the member shown in Figs. 1 and 2.

Referring more particularly to the drawings, the device embodies handles 1, 2 that are pivoted together at 3. For this purpose handle 2 is spliced or forked at 4 to form a recess for the reception of annular tongue 5 of handle 1. Each of the handles 1 and 2 has a bearing part 10 with an aperture 11 for the projection of a shaft 12 upon which a channel link 15 is pivoted. The ends of each of the shafts 12, 12 are spread to hold them in assembled position. Each of the channel links 15, 15 straddles the upper edge of handles 1 and 2 respectively and is in turn pivoted at 16, 16 to one of the two levers 17, 17. Each of the levers 17, 17 is fulcrumed upon a headed bolt 20 carried in clamping plates 21, 21 that are disposed on opposite surfaces of said levers 17, 17. The forward ends of levers 17, 17 are formed into jaws 18, 18 having in each instance a rectangular recess 25, 25 adapted for the reception of a portion of the surface of bolt 30 therein when said bolt 30 is placed in right angle position to said jaws and therebetween. These rectangular recesses 25 each are bounded by two walls which form an angle not greater than a right angle with the work engaging faces of the jaws 18, thereby forming corners 31 at the intersections of these walls and the work engaging faces which penetrate the work. Corners 31 of said jaws will pinch the surface of bolt 30 at diametrically opposite positions, and thereby force the portions 32, 32 of the surface of bolt 30 between opposing corners outward to form swellings or raised portions 32. These raised portions 32 will prevent the nut from turning off bolt 30. Nuts 40, 40 that are mounted on headed bolts 20, 20 are in each instance equipped with annular flanges 41, 41 having peripheral teeth 42 which fit into recesses 43 made in plate 45 that is mounted thereover, whereby to prevent nuts 40 from turning off bolts 20, 20. Clamping plates 21, 21 are held together by a headed bolt 46 passing through the center thereof and by nut 47 mounted on said bolt 46.

The means for adjusting jaws 18, 18 relative to the space therebetween contemplates the movement of channel links 15, 15, on their respective pivots 12, 12 relative to handles 1 and 2, whereby to govern the extent of movement of jaws 18, 18. Said channel links 15, 15 are held in this given relation relative to handles 1 and 2 respectively by employing in each instance two bolts, 50 and 51. Bolt 50 has a flat annular lower part 48 swiveled on a pin 49 disposed transversely through handle 1. An aperture 52 is made in each of handles 1 and 2 for the reception of the lower flat annular part 48 of bolt 50. The upper end of bolt 50 projects through an enlarged recess 53 formed in the respective channel link 15. A nut 55 is mounted on the upper end of bolt 50, whereby to limit the outward swing of the channel link 15. The swing of each of the channel bars 15, 15 in the opposite direction is determined by a set bolt 51 mounted in a threaded aperture in the enlarged part 57 of each of channel links 15, 15. The lower end of each of set bolts 51 abuts against the top surface of handles 1 and 2 slightly concaved for the purpose, whereby to limit the inward swing of channel links 15, 15. The combination of bolts 50 and 51 in each set will aid in determining the relation of the outer or free ends of channel links 15, 15, relative to handles 1 and 2, whereby to govern the amount of movement of jaws 18, 18, relative to each other.

Members 60, 60 composed of some resilient material like rubber are fastened to the inner sides of handles 1 and 2 and adapted to register with each other, whereby to lessen the impact when handles 1 and 2 are brought together.

The operation of the device is effected by first adjusting each set of bolts 50 and 51, whereby to govern the throw of jaws 18, 18 in accordance with the size of bolt 30. Bolt 30 is placed then between jaws 18, 18 in such manner that its threaded part will rest crosswise thereof and be partially within recesses 25, 25. Handles 1 and 2 are moved toward each other thereby swinging the free ends 61, 61 of channel links 15, 15 outward. The outward movement of ends 61, 61 will cause levers 17, 17 to rock on their pivots 20, 20 in such manner that jaws 18, 18 will move inwardly towards each other whereby opposing corners 31 of jaws 18 will cut opposite surfaces of bolt 30 and pinch the threaded portions outward to form nub swellings or elevations 32 adapted to prevent any nut mounted on said bolt 30 from turning thereoff.

It will be noted that jaws 18, 18 move in the opposite direction to handles 1 and 2. This is made possible by the use of channel link 15, 15. Furthermore it has its advantages in that it allows the user to exercise a greater leverage upon jaws 18, 18 by means of handles 1 and 2.

Having thus described my invention what I claim as new and desire to secure by Letters Patent is as follows:

1. In a thread swelling machine, movable jaws having work engaging faces adapted to hold a bolt therebetween and rectangular recesses made in said jaws, and having two walls forming an angle not greater than a right angle with said work engaging faces, whereby to upset the threads of a bolt.

2. In a thread swelling machine, movable jaws, having work engaging faces, adapted to hold a bolt therebetween, means for adjusting the extent of movement of said jaws, and rectangular recesses made in said jaws, and having two walls forming an angle not greater than a right angle with said work engaging faces, whereby to upset the threads of a bolt held therebetween.

3. In a thread swelling machine, movable jaws having work engaging faces, adapted to hold a bolt therebetween, members pivotally connected to said jaws, whereby to adjust the relative movement of said jaws, and rectangular recesses made in said jaws, and having two walls forming an angle not greater than a right angle with said work engaging faces whereby to upset the threads of a bolt held therebetween.

4. In a thread swelling machine, movable jaws having work engaging faces adapted to hold a bolt therebetween, members pivotally united to said jaws, whereby to govern the movement of said jaws relative to each other, handles connected to said members, whereby to actuate said jaws and rectangular recesses made in said jaws, and having two walls forming an angle not greater than a right angle with said work engaging faces, whereby to upset the threads of a bolt held therebetween.

In testimony whereof I have affixed my signature.

CHARLES F. ROBERTS.